(12) United States Patent
Roeper et al.

(10) Patent No.: US 7,857,924 B2
(45) Date of Patent: Dec. 28, 2010

(54) METHOD FOR PRODUCTION OF A MULTI-LAYER ANALYSIS ELEMENT

(75) Inventors: Josef Roeper, Neuhofen (DE); Werner Finke, Einhausen (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 857 days.

(21) Appl. No.: 11/686,085

(22) Filed: Mar. 14, 2007

(65) Prior Publication Data
US 2007/0215582 A1   Sep. 20, 2007

(30) Foreign Application Priority Data
Mar. 14, 2006   (EP)   ................. 06111117

(51) Int. Cl.
*B32B 41/00*   (2006.01)
(52) U.S. Cl. .................. 156/64; 156/257; 156/269; 219/121.62; 219/121.69; 219/121.83
(58) Field of Classification Search .......... 156/64, 156/257, 269; 219/121.62, 121.69, 121.83
See application file for complete search history.

(56) References Cited

U.S. PATENT DOCUMENTS

| | | | |
|---|---|---|---|
| 4,776,904 A | 10/1988 | Charlton et al. | |
| 5,213,876 A | * 5/1993 | Smyth et al. | ............. 428/209 |
| 5,365,032 A | 11/1994 | Mueller et al. | |
| 5,846,837 A | 12/1998 | Thym et al. | |
| 5,935,520 A | 8/1999 | Fujisaki et al. | |
| 6,036,919 A | 3/2000 | Thym et al. | |
| 6,191,382 B1 | 2/2001 | Damikolas | |
| 6,388,231 B1 | 5/2002 | Andrews | |
| 2006/0173380 A1 | 8/2006 | Hoenes et al. | |
| 2006/0216817 A1 | 9/2006 | Hoenes et al. | |

FOREIGN PATENT DOCUMENTS

| | | |
|---|---|---|
| CA | 2311496 | 6/1999 |
| CA | 2506358 | 11/2005 |
| DE | 103 32 488 | 2/2005 |
| DE | 103 43 896 | 4/2005 |
| DE | 102005022022 | 12/2005 |

(Continued)

OTHER PUBLICATIONS

Decision of Final Rejection, JP Patent Application No. 052008/2007; Aug. 24, 2010. (Partial Translation).

*Primary Examiner*—George R Koch, III
(74) *Attorney, Agent, or Firm*—Bose McKinney & Evans LLP

(57) ABSTRACT

The invention relates to a method for production of a multi-layer analysis element for liquid samples, with at least one test field for the analysis of the liquid samples, in which method an analysis element blank composed of at least two superposed material layers is made available. The multi-layer analysis element or a constituent part of the multi-layer analysis element is cut out from the analysis element blank by means of laser radiation. The laser radiation cuts through different material layers in at least two areas and has a laser power which is effective for the cutting and which is varied as a function of the thickness and the material of the different material layers to be cut in the areas.

16 Claims, 3 Drawing Sheets

FOREIGN PATENT DOCUMENTS

| | | |
|---|---|---|
| EP | 0 558 164 | 9/1993 |
| EP | 1 424 040 | 6/2004 |
| JP | 62-22063 | 1/1987 |
| JP | 7-333211 | 12/1995 |
| WO | WO 97/02487 | 1/1997 |
| WO | WO 02/29853 | 4/2002 |
| WO | WO 2004/056269 | 7/2004 |

* cited by examiner

METHOD FOR PRODUCTION OF A MULTI-LAYER ANALYSIS ELEMENT

RELATED APPLICATIONS

This application claims priority to European Patent Application No. 06111117.5, filed Mar. 14, 2006, which is hereby incorporated by reference.

BACKGROUND

The present invention relates to a multi-layer analysis element and to a method for production thereof in which laser radiation is used for cutting.

For analysis of liquid samples, for example body fluids such as blood or urine, analysis appliances are often used in which the sample to be analyzed is located on a test field of an analysis element and, if appropriate, reacts with one or more reagents in the test field before it is analyzed. Optical, in particular photometric, evaluation and electrochemical evaluation of analysis elements are the most common methods for rapid determination of the concentration of analytes in samples. Analysis systems with analysis elements for analysis of samples are generally used in the fields of analysis, environmental analysis and, above all, in medical diagnostics. Analysis elements that are evaluated photometrically or electrochemically are of great importance in particular in the diagnosis of blood glucose from capillary blood.

There are different kinds of analysis elements. For example, substantially square slides are known in the middle of which a multi-layer test field is located. Diagnostic analysis elements of strip shape are referred to as test strips. Analysis elements are widely described in the prior art, for example in the documents CA 2311496 A1, U.S. Pat. No. 5,846,837, U.S. Pat. No. 6,036,919 or WO 97/02487.

Other multi-layer analysis elements known in the prior art are analysis tapes comprising a multiplicity of test fields that are wound up in a cassette for use in an analysis appliance. Such cassettes and analysis tapes are described, for example, in the documents DE 103 32 488 A1, DE 103 43 896 A1, EP 1 424 040 A1, WO 2004/056269 A1 and CA 2506358 A1.

SUMMARY OF THE INVENTION

The present invention relates to multi-layer analysis elements of any desired form, in particular to strip-shaped test elements and to analysis tapes. In the production of such multi-layer analysis elements, a roll-to-roll method is usually employed in which individual or several interconnected layers of the multi-layer analysis elements are present as a wound-up tape and the individual analysis elements or constituent parts thereof are detached from this tape by cutting or punching with suitable knives or punching tools. However, this detachment by means of knives or punching tools has the disadvantage that materials composed of fibres (for example fabric structures) risk fraying, layers containing adhesive risk contaminating the knife, and film coatings (for example reactive films) risk bursting in the area of the cut edge as a result of mechanical loading. Partial separation of the coating at the cut edge results in the formation of undesired particles and dust, and extensive separation can even result in material being rejected. Moreover, the resulting cut edges are sharp, with the result that, when a portion of an analysis tape, for example, with such cut edges is guided through a seal from the cassette for the purpose of receiving and analysing a sample on the portion inside an analysis appliance, it may damage the seals because of its sharp edges.

Exemplary embodiments of the present invention provide multi-layer analysis elements, and a method for production of multi-layer analysis elements, that avoid the disadvantages of the prior art.

A method is provided for production of a multi-layer analysis element for liquid samples, with at least one test field for the analysis of the liquid samples, characterized in that at least two superposed material layers are connected to one another in order to obtain an analysis element blank, and the multi-layer analysis element or a constituent part of the multi-layer analysis element is cut out from the analysis element blank by means of laser radiation. The laser radiation cuts through different material layers in at least two areas, and the laser radiation has a laser power which is effective for this cutting and which is varied as a function of the thickness and the material of the material layers to be cut in said areas.

For production of the multi-layer analysis element according to exemplary embodiments, an analysis element blank composed of at least two superposed material layers is first prefabricated, preferably by connecting the at least two superposed material layers. These material layers can have different thicknesses and also different planar extents, such that, in cross section, the blank has different thicknesses and different material combinations in different areas. The material layers can be connected fixedly to one another, for example by adhesive bonding or welding. For example, on superposed and fixedly interconnected layers consisting of an adhesive and of a polymer tape, which together form an adhesive tape, it is possible to apply a detection film in the form of a central longitudinal strip which adheres to the polymer tape and which, after separation of the multi-layer analysis elements or their constituent parts, provides the detection chemical for a large number of test fields for analysis of liquid samples.

A test field in this context is a delimited area of the analysis element within which the liquid sample is located during its electrochemical or photometric analysis. The test field can contain a detection chemical which reacts with the sample and thereby causes an effect (for example a color change) that can be detected upon analysis of the sample.

The at least two material layers, in particular, several material layers connected to one another by adhesive, form an analysis element blank which comprises at least two areas with different material layers that have to be cut through when the analysis element or the constituent part of the analysis element is cut out. This means that the layer thicknesses and/or the compositions of the successive layers to be cut differ in the different areas of the analysis element blank. Along a cut effected by a laser cutter, the profile of the layers of the analysis element blank to be cut therefore differs in the different areas, such that a different laser power is needed for achieving a defined cutting depth, in particular for cutting through all the material layers in the different areas. The analysis element blank can also comprise material layers that are not intended to be cut through during the cutting of the multi-layer analysis element or their constituent parts. For example, the interconnected layers that have been cut through can be pulled off from a support layer that is not cut through, and they can then be used as labels.

In exemplary embodiments, the multi-layer analysis element or the constituent part of the multi-layer analysis element is cut out from the analysis element blank by means of laser radiation. Cutting by means of laser radiation is known in the art for production of a wide variety of devices and is described, for example, in U.S. Pat. No. 4,776,904, U.S. Pat. No. 6,191,382 and U.S. Pat. No. 6,388,231.

A constituent part of a multi-layer analysis element is in this context an element according to the invention that has been cut out from the analysis element blank and is further processed for production of the analysis element, for example connected to other elements. In one embodiment of the present invention, the constituent part is a label, cut out from at least one adhesive tape, with a detection film located thereon, which is affixed to a transport tape in order to produce an analysis tape.

Commercial lasers can be used for cutting by means of laser radiation, for example Nd:YAG or $CO_2$ lasers. $CO_2$ lasers with a laser beam with a wavelength of 10.6 μm are used in exemplary embodiments. The beam diameter of the cutting laser beam of a $CO_2$ laser is preferably between 80 and 400 μm. The beam diameter of the cutting laser beam of an Nd:YAG laser is preferably between 20 and 200 μm. The beam diameter of the cutting laser beams is preferably between 20 and 400 μm.

A process gas can be used when cutting by means of laser radiation, such that, by rapid elimination of the melt in the area of the joint, a cooling effect takes place which, depending on the cut material, can lead to an improvement in the quality of the cut edge. At the same time, an inflowing process gas can protect the laser optics (focussing lens) and ensure less thermal loading of the environment. Typical process gases are air, $N_2$, Ar or mixtures thereof.

In exemplary embodiments, the laser radiation used for cutting the analysis element or a constituent part of the analysis element has a laser power which is effective for this cutting and which is varied as a function of the thicknesses and materials of the material layers to be cut in the different areas. This has the advantage that the cutting depth in each area of the analysis element blank can be controlled. The present invention thus provides a method for contactless separation (without mechanical influences such as knives or ultrasound), by which analysis elements or analysis element constituents can be cut with a defined cutting depth from multi-layer analysis element blanks, which can consist for example of a support film, adhesive layers, an enzyme-containing detection layer and a fabric. Depending on the substrate, it is possible, by adjusting the power while maintaining a constant focus position, to introduce an optimal energy per unit length (J/m) into the material to be cut. In addition to this, the energy introduced can be controlled by changing the focus position.

In the case of materials composed of fibres (for example polymer fabrics), fraying can advantageously be avoided by cutting by means of laser radiation. Adhesive-containing layers can be cut by means of laser without any contamination of the cutting instrument. No undesired particles or dust are formed during cutting.

The cutting by means of laser radiation also affords the advantage of increased flexibility in the formation of a cutting contour. For contour cutting, a laser beam emerging from a laser is successively directed at two mirrors that can be tilted in the x direction and y direction and from there is focussed on the analysis element that is to be cut. The two mirrors are automatically tilted by scanners (for example electronic drives), such that the focussed laser beam travels along the desired contour on the analysis element blank at a defined speed. The analysis element blank is able to move relative to the mirrors or can remain stationary until the respective contour has been created. The scanners of the mirrors can be controlled by a control appliance.

In exemplary embodiments, the laser power effective for cutting can be varied, for example, by means of a pre-programmed control system or as a function of values which are determined by means of a sensor during the cutting and which concern the thicknesses and the materials of the different material layers to be cut.

In exemplary embodiments, the laser power effective for cutting can, for example, be varied by a pre-programmed control system of the laser cutter. For this purpose, all thicknesses and material combinations in the analysis element blank in all areas along the planned cut have to be known, or the laser powers needed for carrying out the cutting have to be determined experimentally in advance and depending on the thickness and the material in the different areas. This variant is recommended in a roll-to-roll method in which the same contour always has to be cut out from constantly repeating and identically constructed areas of a tape-like analysis element blank. In this method, material layers with the same profile are repeatedly cut through by means of the laser radiation. The profile in terms of the different layer thicknesses and/or layer materials to be cut in the different areas is repeated for each contour, so that the laser power variations needed to achieve a defined cutting depth in each area are likewise repeated during the cutting of each individual contour. The software used to control the laser can in this case be pre-programmed and optimized accordingly.

In exemplary embodiments, however, the variation in the laser power needed for cutting can also take place as a reaction of the laser cutter to data measured by sensors and relating to the thickness to be cut and the material of the analysis element to be cut. A sensor can, for example, optically detect specific fields on the surface of the analysis element blank, whereupon an evaluation unit assigns these fields certain thicknesses and/or materials, which have to be known in advance. However, it is also possible, for example, for a sensor to measure the thickness of the area that is to be cut. In this case, the laser power is regulated on-line as a function of the thicknesses and/or materials determined by means of the sensor for the respective area of the layers that are to be cut, in order to achieve a desired cutting depth in each area.

According to one embodiment, the laser power effective for the cutting is varied by at least one method chosen from the group including variation of laser power provided by a laser, by control of the laser or by an external element for power variation, variation of laser beam diameter of the laser radiation used for the cutting, variation of the speed of movement of the laser radiation and of the analysis element blank relative to one another, and variation of a focus position (height of the focus) of the laser radiation relative to the analysis element blank.

An external element for power variation is arranged outside the laser and influences the laser power effective for the cutting by varying the laser power made available by the laser. Examples of such external elements for power variation include, for example, Q-switches. The speed of movement of the laser radiation and of the analysis element to be cut relative to one another arises from the scanning speed of the cutting laser beam and/or the conveying speed of the analysis element blank relative to the laser optics.

According to an exemplary embodiment, the method for production of a multi-layer analysis element is a roll-to-roll method in which analysis element blanks are produced in a band shape and the analysis elements or constituent parts thereof are cut out from the latter by means of laser radiation.

At least two material layers are used in the method for production of the analysis element blank and comprise at least one layer from the following group: polymer layer, hydrophobic layer, adhesive layer, fabric layer, metal-coated polymer layer, metal layer, and layer meltable by the laser radiation.

A polymer layer is, for example, a layer of a polymer chosen from polyester, polyimides, polyetherketones, polyamides, polysulfones, polyether sulfones, polyether imides, polycarbonate, polyolefins, polymethyl methacrylate (PMMA), fibre-reinforced polymers, polytetrafluorotheylene (PTFE), polyurethanes or mixtures of these. The polymer layer can, for example, be provided as a support and/or as a layer that can be melted at the cut edge by the laser radiation.

A hydrophobic layer prevents spreading of an aqueous sample. It can, for example, surround a test field in such a way that a liquid sample is "trapped" in the test field. The hydrophobic layer can be produced, for example, by impregnation of defined areas of other layers of the analysis element blank.

An adhesive layer is a layer of an adhesive which can serve for connecting the individual material layers to one another or to at least one test field or for connecting an analysis element constituent to another analysis element constituent.

A fabric layer is a fibre-containing fabric. It can, for example, be a polymer fabric that covers the test field of the analysis element and, by virtue of its structure, contributes to the dispersing of a liquid sample in the test field. It can also be provided as a layer that melts at the cut edge as a result of the laser radiation.

In test strips that are to be evaluated electrochemically, a metal-coated polymer layer or a metal layer can, for example, be provided for the provision of electrodes or as a structure for transmitting electrical signals. The metal-coated polymer layer or the metal layer contains, for example, a metal such as palladium, platinum, gold, silver, titanium or copper.

A layer that can be melted by the laser radiation is, for example, a thermoplastic polymer layer that is melted by the laser radiation in the area of the cut edge that is formed. According to an exemplary embodiment, during the cutting of the multi-layer analysis element or of the constituent part of the multi-layer analysis element by means of laser radiation from the analysis element blank along at least one cut edge, at least one material layer is melted by the laser radiation, such that it has a rounding effect on the cut edge. This has the advantage that the rounded cut edge does not cause any injuries or damage, for example, if it is moved along the skin of a patient or along a seal in the analysis appliance.

Each of at least two material layers of the analysis element blank has a thickness of 0.05 µm to 300 µm, particularly preferably of 5 µm to 80 µm. The analysis element blank preferably has, in its thickest area, a thickness of 10 µm to 180 µm, preferably of between 80 µm and 300 µm.

According to an exemplary embodiment, during the cutting of the multi-layer analysis element or of the constituent part of the multi-layer analysis element by means of laser radiation in at least two areas, all or some of the material layers of the analysis element blank are cut through. This can be controlled very precisely by the laser power which is effective for the cutting and by which the cutting depth can be determined.

In one embodiment, the multi-layer analysis element is a test strip with a test field for electrochemical or photometric analysis of a liquid sample and is detached, by means of the laser radiation, from an analysis element blank in the form of a tape of test strips.

In another embodiment, the multi-layer analysis element is an analysis tape with several test fields spaced apart from one another in the tape direction, in which case the analysis element blank is prefabricated in the form of a test label tape composed at least of a detection film and an adhesive tape, and self-adhesive test labels each containing a test field are in each case cut out from the test label tape by means of laser radiation and are used as the constituent parts of the analysis tape. The test labels are preferably transferred to a transport tape, and the analysis tape is cut out from the transport tape provided with the test labels, by longitudinal cuts formed by means of laser radiation. These longitudinal cuts form cut edges along the longitudinal margins of the respective analysis tape. The longitudinal cuts can serve for cutting out an analysis tape of defined width from a transport tape. However, several analysis tapes can also be cut out from adjacent parts of one transport tape. Since these are cuts in the longitudinal direction of the conveyor tape, which do not require any change of direction of the cutting laser beam or laser beams, it is possible to use a stationary laser beam which is directed at the transport tape that is moved relative to the laser beam at a defined and, if appropriate, constant speed. For this method, it is expedient to use a roll-to-roll conveyor device for moving the transport tape that can be rolled up and is provided with the test labels.

The invention further relates to a multi-layer analysis element for liquid samples, with at least two (preferably interconnected) material layers. The multi-layer analysis element comprises at least one test field for the analysis of the liquid samples. The analysis element has cut edges which extend through at least two areas with different material layers and which have been generated by laser radiation with a laser power adapted to the thickness and the material of the areas and effective for the cutting. The multi-layer analysis element according to the invention can be produced by the above-described method.

The analysis element is preferably an analysis tape with a multiplicity of test fields spaced apart from one another in the tape direction, where the test fields are arranged on self-adhesive test labels which comprise at least a detection film and an adhesive tape and which are affixed to a support tape, the test labels having cut edges which extend through areas with the adhesive tape and through areas with the detection film and the adhesive tape and which have been generated by cutting with laser radiation with laser power adapted to the thickness and the materials of the cut material layers in the areas and effective for cutting. Moreover, along longitudinal margins, the support tape can have longitudinal cut edges that have been generated by laser radiation during cutting of the analysis tape from the transport tape. In the analysis tape, the transport tape itself, onto which the test labels are affixed for producing the analysis tape, can serve as the support tape of the analysis tape. However, at least one analysis tape with longitudinal cuts, which can be made by means of laser radiation or by another cutting method known to a person skilled in the art, can also be cut off from the transport tape containing the test labels.

Further details and advantages of the present invention are explained hereafter on the basis of an exemplary embodiment with reference to the attached figures. The features illustrated therein can be used individually or in combination to provide preferred embodiments of the present invention.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
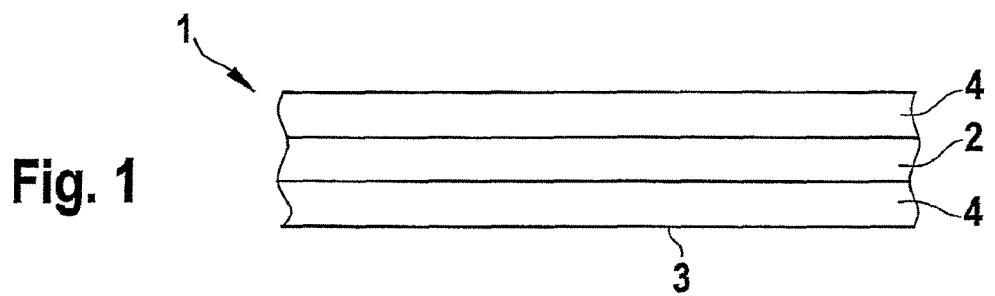
FIG. 1 is a schematic plan view of an analysis element blank for production of a multi-layer analysis element.

FIG. 1 shows an analysis element blank for production, of a multi-layer analysis element in the form of an analysis tape. The analysis element blank 1 comprises several material layers, in particular an adhesive tape with at least one polymer layer and at least one adhesive layer, onto which a further material layer in the form of a detection film 2 has been applied. The detection film 2 covers only a central strip of the other layers 3 of the analysis element blank 1, such that the analysis element blank 1 has a greater thickness in the area of the detection film 2 and, in cross section, has a different material composition than in the strip-shaped areas 4 that are not covered by the detection film 2.

Figure 2:
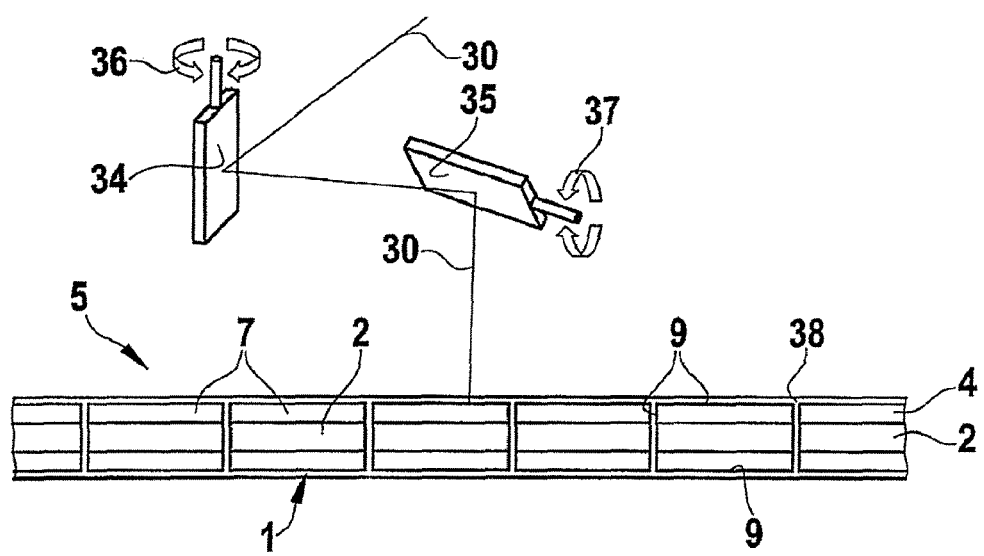
FIG. 2 shows the analysis element blank from FIG. 1, from which labels, as a constituent part of an analysis element, have been cut out by means of laser radiation.

FIG. 2 shows the analysis element blank 1 from FIG. 1, from which labels, as a constituent part of an analysis element, have been cut out by means of laser radiation. An analysis tape is produced by a two-stage roll-to-roll treatment. In the first stage, in accordance with FIGS. 1 and 2, a test label tape 5 is prefabricated, from which, in the second stage according to FIG. 3, test labels 7 that have been cut out by laser radiation and contain test fields 6 are removed (as constituent parts of a multi-layer analysis element according to the invention) and are affixed to a transport tape 8.

The test labels 7 are cut out by means of a laser beam 30 which travels along the contour 9. The laser beam 30 emerging from a laser (not shown) is directed in succession at two mirrors 34, 35. The first mirror 34 can deflect the laser beam 30 in the x direction by means of its tilting in the first direction of rotation 36. The second mirror 35 can deflect the laser beam 30 in the y direction by means of its tilting in the second direction of rotation 37. In this way, any desired contour, and in particular the contour 9 of the test labels 7, can be traveled along by the laser beam 30.

On cutting the test labels 7 from the analysis element blank 1, the laser radiation cuts through the strip-shaped areas 4 (without detection film) and the area with the detection film 2. These areas 4, 2 have different thicknesses, and their layers to be cut through have different material combinations. The effective laser power of the laser beam 30 that travels along the contour 9 of the test labels is varied as a function of the thickness and/or the materials of the layers to be cut in the different areas, preferably by varying the laser power provided by the used laser while maintaining a constant laser beam diameter, a constant laser scanning speed and a constant speed of the analysis element blank 1. The laser power is chosen in each area such that a defined cutting depth is achieved. In the embodiment shown in FIG. 2, it is preferable that not all the layers along the contour 9 are cut through by means of the laser radiation, and that instead the laser power is adapted in each area such that a lowermost support layer 38 remains substantially unaffected. The test labels 7 can then be removed from this lowermost support layer 38 and affixed to a transport tape, as is shown in FIG. 3.

Figure 3:
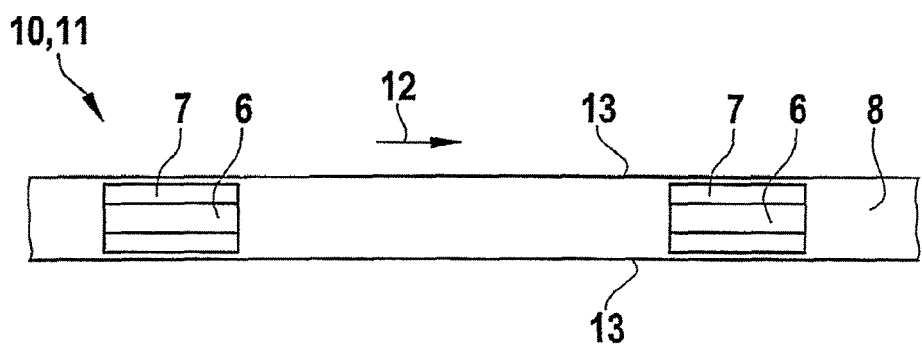
FIG. 3 is a schematic plan view of a multi-layer analysis element in the form of an analysis tape, produced by the method according to exemplary embodiments.

FIG. 3 shows a multi-layer analysis element in the form of an analysis tape that has been produced by an exemplary method. The multi-layer analysis element 10 in the form of an analysis tape 11 comprises a support tape 8 and a multiplicity of test fields 6 which are spaced apart from one another in the tape direction 12 and which are located on the multi-layer test labels 7. The support tape 8 has cut edges 13 that can also have been cut by laser radiation. These cut edges in this case are obtained by longitudinal cuts by means of which the support tape 8 of the analysis tape is cut out from a transport tape (not shown) by laser radiation. However, if the transport tape already has the desired width, it can serve as the support tape 8 of the analysis tape 11 without being cut to size for this purpose.

Figure 4:
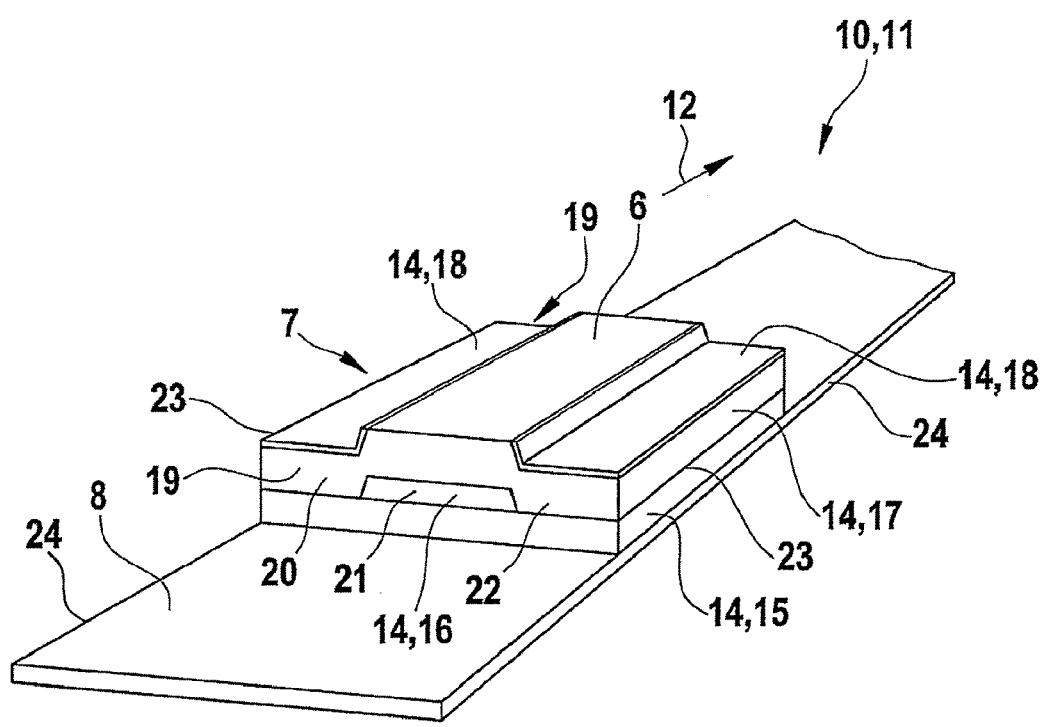
FIG. 4 is a schematic and lateral perspective view of a multi-layer analysis element in the form of an analysis tape, produced by the method according to an exemplary embodiment of the invention.

FIG. 4 shows a perspective view of a multi-layer analysis element in the form of an analysis tape that has been produced by an exemplary method according to these teachings. The analysis tape 11 comprises a support tape 8 and test labels 7. The test labels 7 comprise several material layers 14 which have been cut to size by means of laser radiation. These material layers 14 include two adhesive layers and a polymer layer which form an adhesive tape 15, a detection film 16 which contains a test chemical, a polymer fabric layer 17 which at the center covers the detection film 16 and at the sides covers the adhesive tape 15, and hydrophobic layers 18 which are arranged as lateral strips on the polymer fabric layer 17. The layer sequence can also be chosen different than this. For example, the hydrophobic layers 18 can also be arranged under the polymer fabric layer 17 and above the adhesive tape 15. In the embodiment according to FIG. 4, the test field 6 on which the analysis of a liquid sample can be performed is situated centrally on the test label 7.

The analysis element 10 according to FIG. 4 has, transverse to the tape direction 12, cut edges 19 which delimit the test label 7 and which extend through three areas 20, 21, 22 with material layers 14 composed of different materials and with different thicknesses. In the first area 20, the laser radiation according to the invention has cut through the following material layers: hydrophobic layer 18, polymer fabric layer 17 and adhesive tape 15. In the second area 21, the laser radiation has cut through the following material layers: polymer fabric layer 17, detection film 16 and adhesive tape 15. The material layers 14 cut by the laser radiation in the third area 22 correspond to those of the first area 20. The cut edges 19 have been generated by means of laser radiation which had a laser power adapted to the thickness and the material of the material layers in the three areas 20, 21, 22 and effective for the cutting. By means of the cutting by laser radiation for generating all the cut edges 19, 23 of the test label 7 and the longitudinal cut edges 24 of the support tape 8, defined material layers 14 and the support tape have been melted at the cut edges 19, 23, 24 and thereby rounded (not shown), with the result that the sealing element of a cassette that receives the analysis tape 11 cannot be damaged by sharp edges as the analysis tape 11 is transported along the sealing element of the cassette.

Figure 5:
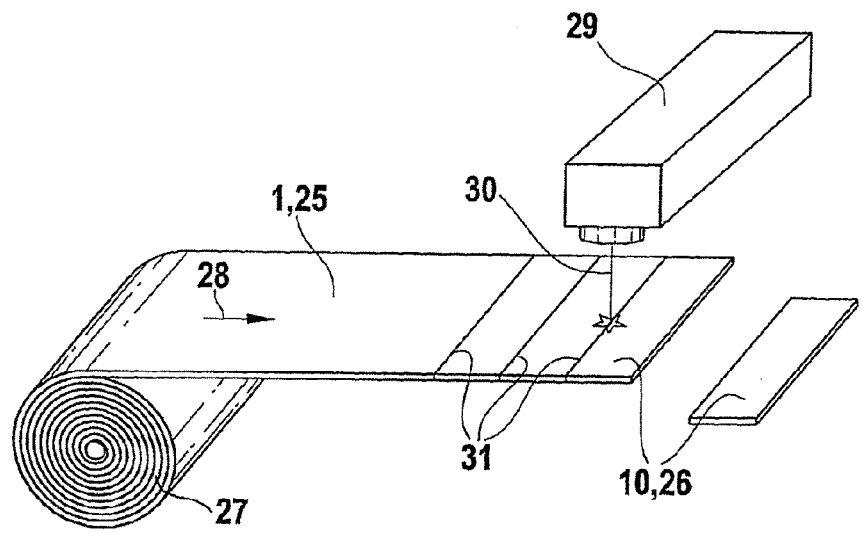
FIG. 5 is a schematic representation of a first embodiment of a method in which test strips are cut out from a tape.

FIG. 5 is a schematic representation of an embodiment of a method in which test strips are cut from a tape by means of laser radiation. A tape 25 composed of a multiplicity of test strips 26 is present as analysis element blank 1. The tape 25 is unreeled from a roll 27 and moved in the transport direction 28 towards a cutting laser 29. The test strips 26 joined to one another in the tape 25 are multi-layer analysis elements 10 which each have a test field (not shown) for electrochemical or photometric analysis of a liquid sample. A laser beam 30 from the laser 29 is directed at the tape 25 of test strips 26. The laser beam 30 in each case travels along the cut lines 31 in order to separate the test strips 26 from the tape 25 and thus isolate them. The laser beam 30 has a power which is effective for cutting and which is varied along the cut lines 31 as a function of the thicknesses and materials of the material layers of the test strips 26 that are to be cut, such that a laser power is made available which is sufficient for cutting the test strips 26 off, but which is not too high.

Figure 6:
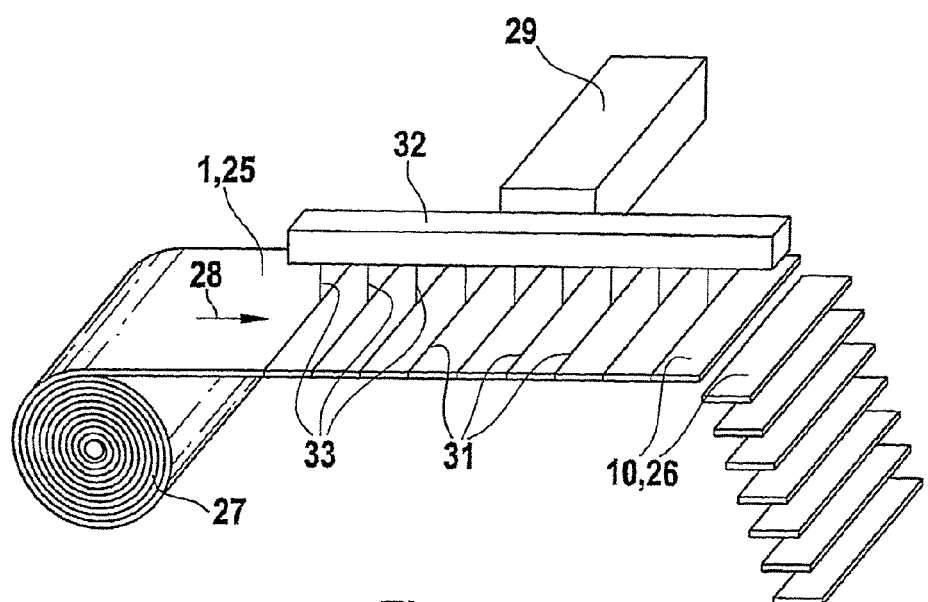
FIG. 6 is a schematic representation of a second embodiment of a method in which test strips are cut out from a tape.

FIG. 6 is a schematic representation of another embodiment of a method in which test strips are cut off from a tape by means of laser radiation. A tape 25 composed of a multiplicity of test strips 26 is present as analysis element blank 1. The tape 25 is unreeled from a roll 27 and moved in the transport direction 28 towards a cutting laser 29. The test strips 26 joined to one another in the tape 25 are multi-layer analysis elements 10 which each have a test field (not shown) for electrochemical or photometric analysis of a liquid sample. A laser beam (not shown) from the laser 29 is split by an optical component 32 into a multiplicity of parallel laser beams 33.

The laser beams 33 are directed at the tape 25 of test strips 26. The laser beams 33 simultaneously travel along a multiplicity of parallel cut lines 31 in order to separate the test strips 26 from the tape 25 and thus isolate them. The laser beams 33 have a power which is effective for cutting and which is varied along the cut lines 31 as a function of the thicknesses and materials of the material layers of the test strips 26 that are to be cut, such that a laser power is made available which is sufficient for cutting the test strips 26 off, but which is not too high.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMBERS 1 analysis element blank
2 detection film
3 layers
4 strip-shaped areas
5 test label tape
6 test fields
7 test labels
8 support tape or transport tape
9 contour
10 multi-layer analysis element
11 analysis tape
12 tape direction
13 cut edges
14 material layers
15 adhesive tape
16 detection film
17 polymer fabric layer
18 hydrophobic layer
19 cut edges
20 first area
21 second area
22 third area
23 cut edges
24 longitudinal cut edges
25 tape
26 test strip
27 roll
28 transport direction
29 laser
30 laser beam
31 cutting lines
32 optical component
33 laser beams
34 first mirror
35 second mirror
36 first direction of rotation
37 second direction of rotation
38 lowermost support layer

What is claimed is:

1. A method for producing a multi-layer analysis element of the type having at least one test field for analysis of liquid samples, the method comprising:
providing an analysis element blank comprising at least two superposed material layers; and
using laser radiation to cut from the analysis element blank a multi-layer analysis element or a constituent part of a multi-layer analysis element, wherein the laser radiation cuts through different material layers in at least two areas and the laser radiation has a laser power which is effective for the cutting and which is varied as a function of the thicknesses and composition of the different material layers;
wherein, during the cutting, at least one material layer is melted by the laser radiation to produce a rounding effect on the cut edge.

2. The method of claim 1, wherein the at least two superposed material layers are adhered to one another.

3. The method of claim 1, wherein the laser power effective for the cutting is varied by one or more of the following: (a) adjusting an external element; (b) variation of laser beam diameter of the laser radiation used for the cutting; (c) variation of the speed of movement of the laser radiation and of the analysis element blank relative to one another; and (d) variation of focus position of the laser radiation relative to the analysis element blank.

4. The method of claim 1, wherein the laser power effective for the cutting is varied by a pre-programmed control system or is varied as a function of thickness and material composition values which are determined by a sensor during the cutting.

5. The method of claim 1, wherein the at least two material layers comprise at least one layer chosen from the group consisting of a polymer layer, hydrophobic layer, adhesive layer, fabric layer, metal-coated polymer layer, metal layer, and a layer meltable by the laser radiation.

6. The method of claim 1, wherein, during the cutting, at least one of the material layers of the analysis element blank is cut through.

7. The method of claim 1, wherein the multi-layer analysis element is a test strip with a test field configured for electrochemical or photometric analysis of a liquid sample and is detached by laser radiation from the analysis element blank, which comprises a tape of test strips.

8. The method of claim 1, wherein the multi-layer analysis element comprises an analysis tape having several test fields spaced apart from one another in the tape direction, and the analysis element blank is prefabricated as a test label tape comprised of a detection film and an adhesive tape, wherein self-adhering test labels each containing a test field are cut from the test label tape by the laser radiation and are used as the constituent parts of the analysis tape.

9. The method of claim 8, wherein the test labels are transferred onto a transport tape, and the analysis tape is cut out from the transport tape provided with the test labels by longitudinal cuts formed by laser radiation.

10. A method for producing a multi-layer analysis element or a constituent part of a multi-layer analysis element of the type having at least one test field for analysis of liquid samples, the method comprising:

provided a blank comprising at least two superposed material layers, the blank having different thicknesses and different material compositions in different areas thereof;

cutting through the analysis element blank using laser radiation to create a multi-layer analysis element or a constituent part of a multi-layer analysis element; and maintaining a defined cutting depth with the laser throughout the different thicknesses and material compositions of the blank by varying the laser power effective for cutting as a function of material thickness and composition;

wherein, during the cutting, at least one material layer is melted by the laser radiation to produce a rounding effect on the cut edge.

11. The method of claim 10, wherein the varying the laser power effective for cutting comprises one or more of the following: (a) adjusting an external element; (b) variation of laser beam diameter of the laser radiation used for the cutting; (c) variation of the speed of movement of the laser radiation and of the blank relative to one another; and (d) variation of focus position of the laser radiation relative to the blank.

12. The method of claim 11, wherein the varying the laser power effective for cutting is done by a pre-programmed control system or by sensing material thickness or composition values.

13. The method of claim 12, further comprising:

maintaining at least one bottom layer of the blank uncut, wherein the cutting through the blank produces test labels;

removing the test labels from the at least one bottom layer; and adhering the test labels in a spaced apart configuration on a transport tape.

14. The method of claim 13, further comprising cutting the transport tape with laser radiation and thereby producing a rounding effect on the transport tape.

15. The method of claim 11, wherein the varying the laser power effective for cutting is done by a pre-programmed control system.

16. The method of claim 11, wherein the varying the laser power effective for cutting is done by sensing material composition and thickness values.

\* \* \* \* \*